United States Patent
Sakurai (10) Patent No.: US 9,115,660 B2
(45) Date of Patent: Aug. 25, 2015

(54) EXHAUST PURIFYING SYSTEM FOR INTERNAL COMBUSTION ENGINE

(75) Inventor: Kenji Sakurai, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1124 days.

(21) Appl. No.: 13/000,054

(22) PCT Filed: Oct. 6, 2009

(86) PCT No.: PCT/JP2009/067422
§ 371 (c)(1),
(2), (4) Date: Dec. 20, 2010

(87) PCT Pub. No.: WO2011/042956
PCT Pub. Date: Apr. 14, 2011

(65) Prior Publication Data
US 2011/0138783 A1    Jun. 16, 2011

(51) Int. Cl.
*F01N 3/00*    (2006.01)
*F02D 41/02*   (2006.01)
*F01N 3/08*    (2006.01)
*F01N 3/10*    (2006.01)
(Continued)

(52) U.S. Cl.
CPC ........ *F02D 41/0275* (2013.01); *B01D 53/9477* (2013.01); *B01D 53/9495* (2013.01); *F01N 3/0842* (2013.01); *F01N 3/0871* (2013.01); *F01N 3/101* (2013.01); *F01N 3/208* (2013.01); *F01N 9/00* (2013.01); *F01N 13/0093* (2014.06); *F02D 41/146* (2013.01); *F02D 41/1441* (2013.01); *F02D 41/1454* (2013.01); *B01D 53/9418* (2013.01); *B01D 53/9422* (2013.01); *B01D 53/9445* (2013.01); *B01D 2255/20738* (2013.01); *B01D 2255/50* (2013.01); *B01D 2255/91* (2013.01); *F01N 2340/00* (2013.01);
(Continued)

(58) Field of Classification Search
CPC . B01D 53/9477; F01N 13/009; F01N 3/2073; F01N 3/101; F02D 41/1454
USPC ............................. 60/286, 297, 295, 285, 276
See application file for complete search history.

(56) References Cited

U.S. PATENT DOCUMENTS 6,553,757 B1 *   4/2003   Surnilla et al. ................... 60/285
7,886,527 B2 *   2/2011   Solbrig ............................ 60/286
(Continued)

FOREIGN PATENT DOCUMENTS

JP    2000-356125 A    12/2000
JP    2001-271679 A    10/2001
(Continued)

*Primary Examiner* — Audrey K Bradley
*Assistant Examiner* — Anthony Ayala Delgado
(74) *Attorney, Agent, or Firm* — Kenyon & Kenyon LLP (57) ABSTRACT

An object is to provide an exhaust purifying system for an internal combustion engine having an NSR catalyst, which can inhibit emissions from being aggravated by blow-by of NOx. An exhaust purifying system for an internal combustion engine capable of a lean burn operation is provided. The exhaust purifying system includes: an NSR catalyst disposed in an exhaust passage of the internal combustion engine; an SCR disposed downstream of the NSR catalyst; a NOx sensor disposed downstream of the SCR, the NOx sensor producing an output according to an $NH_3$ concentration; and rich spike means for performing a rich spike. The rich spike means starts the rich spike at a predetermined timing during a lean burn operation and terminates the rich spike at a timing when the NOx sensor issues a predetermined output characteristic indicative of a rise in the $NH_3$ concentration.

8 Claims, 9 Drawing Sheets (51) Int. Cl.
F01N 3/20 (2006.01)
F01N 9/00 (2006.01)
F02D 41/14 (2006.01)
F01N 13/00 (2010.01)
B01D 53/94 (2006.01)

(52) U.S. Cl.
CPC ..... *F01N 2560/025* (2013.01); *F01N 2560/026* (2013.01); *F01N 2560/14* (2013.01); *F01N 2900/1622* (2013.01); *Y02T 10/22* (2013.01); *Y02T 10/24* (2013.01); *Y02T 10/47* (2013.01)

(56) References Cited

U.S. PATENT DOCUMENTS

| | | | |
|---|---|---|---|
| 8,001,768 B2 * | 8/2011 | Cleary et al. | 60/285 |
| 8,392,091 B2 * | 3/2013 | Hebbale et al. | 701/102 |
| 2002/0069640 A1 | 6/2002 | Irisawa et al. | |
| 2004/0168431 A1 * | 9/2004 | Goralski et al. | 60/286 |
| 2005/0129601 A1 * | 6/2005 | Li et al. | 423/239.2 |
| 2007/0122317 A1 * | 5/2007 | Driscoll et al. | 422/170 |
| 2009/0149318 A1 * | 6/2009 | Gandhi et al. | 502/73 |
| 2010/0071347 A1 | 3/2010 | Yoshida et al. | |
| 2010/0101221 A1 * | 4/2010 | Charbonnel et al. | 60/301 |
| 2010/0107605 A1 * | 5/2010 | Brinkman et al. | 60/301 |
| 2010/0132335 A1 * | 6/2010 | Theis | 60/286 |

FOREIGN PATENT DOCUMENTS

| | | |
|---|---|---|
| JP | 2002-188433 A | 7/2002 |
| JP | 2006-512529 A | 4/2006 |
| JP | 2008-303759 A | 12/2008 |
| JP | 2009-62850 A | 3/2009 |

\* cited by examiner

EXHAUST PURIFYING SYSTEM FOR INTERNAL COMBUSTION ENGINE

This is a 371 national phase application of PCT/JP2009/067422 filed 6 Oct. 2009, the content of which is incorporated herein by reference.

TECHNICAL FIELD

The present invention relates, in general, to exhaust purifying systems for internal combustion engines and, in particular, to an exhaust purifying system for an internal combustion engine performing a rich spike control that temporarily makes an air-fuel ratio rich in order to purify NOx stored in a NOx storage-reduction catalyst.

BACKGROUND ART

There has been known a system that includes a NOx storage-reduction catalyst (hereinafter referred to as an "NSR catalyst") disposed in an exhaust passage of an internal combustion engine as disclosed in, for example, JP-A-2001-271679. The NSR catalyst has a storage function of internally storing nitrogen oxide (NOx) contained in a burned gas discharged from the internal combustion engine and a catalyst function of purifying, for example, NOx and hydrocarbon (HC). When the internal combustion engine is operated at a lean air-fuel ratio, an exhaust gas containing a large amount of NOx is discharged. The NSR catalyst therefore stores the NOx internally to inhibit the same from being released to a downstream side of the catalyst.

The NOx stored in the NSR catalyst is purified at a predetermined timing. More specifically, the above conventional art system performs rich spike that temporarily discharges an unburned component from the internal combustion engine. The NOx of the catalyst is thereby reacted with the unburned component in the catalyst.

When a large amount of unburned component is discharged from the internal combustion engine as a result of the initiation of the rich spike, the exhaust gas released to the downstream side of the NSR catalyst is a stoichiometric environment as long as NOx to be reduced by the unburned component is left in the catalyst. When reduction of NOx stored in the catalyst is thereafter completed, the unburned component is released downstream of the catalyst, so that the exhaust gas changes to a rich environment. The above conventional art system is adapted to detect such a change of the exhaust gas downstream of the catalyst to the rich environment, from oxygen concentration or nitrogen oxide concentration and, at the detecting timing, terminate the rich spike. This prevents performance of excessive rich spike, so that fuel efficiency can be prevented from being aggravated.
Patent Document 1: JP-A-2001-271679
Patent Document 2: JP-A-2000-356125

DISCLOSURE OF INVENTION

Problems to be Solved by the Invention

The above-described conventional art system processes NOx stored in the NSR catalyst by rich spike. Performance of the rich spike may, however, involve release of part of the stored NOx downstream of the catalyst. Specifically, when the unburned component as a reducing agent is introduced to the NSR catalyst as a result of the performance of the rich spike, the stored NOx is desorbed and reacted on the catalyst. Part of the desorbed NOx, however, leaks downstream of the catalyst without being purified on the catalyst. A possible method for inhibiting this blow-by of NOx is to increase catalyst capacity to thereby increase a reaction field; however, the increased capacity of the catalyst invites a considerable increase in cost as a result of the increase in noble metal. There is therefore a need for a system that can inhibit emissions from being aggravated by the blow-by of NOx without having to increase the catalyst capacity.

The present invention has been made to solve the foregoing problem and it is an object of the present invention to provide an exhaust purifying system for an internal combustion engine having an NSR catalyst that can inhibit emissions from being aggravated by blow-by of NOx.

Means for Solving the Problems

To achieve the foregoing object, a first aspect of the present invention provides an exhaust purifying system for an internal combustion engine capable of a lean burn operation. The exhaust purifying system is characterized by including: an NOx storage-reduction catalyst (hereinafter referred to as an "NSR catalyst") disposed in an exhaust passage of the internal combustion engine; an NOx selective catalytic reduction (hereinafter referred to as an "SCR") disposed downstream of the NSR catalyst; an exhaust gas sensor disposed downstream of the SCR, the exhaust gas sensor producing an output according to an $NH_3$ concentration; and rich spike means for performing a rich spike. The exhaust purifying system is characterized in that the rich spike means starts the rich spike at a predetermined timing during a lean burn operation and terminates the rich spike at a timing when the exhaust gas sensor issues a predetermined output characteristic indicative of a rise in the $NH_3$ concentration.

The exhaust purifying system for an internal combustion engine according to a second aspect of the present invention is characterized, in the first aspect of the present invention, by further comprising: a three-way catalyst disposed upstream of the NSR catalyst; and a second exhaust gas sensor disposed upstream of the NSR catalyst and downstream of the three-way catalyst, the second exhaust gas sensor producing an output according to an oxygen concentration. The exhaust purifying system is characterized in that: the rich spike means includes: first rich spike means for performing a rich spike at a predetermined air-fuel ratio; second rich spike means for performing a rich spike at an air-fuel ratio leaner than the predetermined air-fuel ratio; and switchover means for switching operation mode from the first rich spike means to the second rich spike means at a timing when the second exhaust gas sensor issues a predetermined output characteristic indicative of a reduction in the oxygen concentration when the internal combustion engine runs at light load.

The exhaust purifying system for an internal combustion engine according to a third aspect of the present invention is characterized, in the first aspect of the present invention, by further comprising: a third exhaust gas sensor disposed downstream of the NSR catalyst and upstream of the SCR, the third exhaust gas sensor producing an output according to the oxygen concentration. The exhaust purifying system is characterized in that the rich spike means includes: first rich spike means for performing a rich spike at a predetermined air-fuel ratio; second rich spike means for performing a rich spike at an air-fuel ratio leaner than the predetermined air-fuel ratio; and second switchover means for switching operation mode from the first rich spike means to the second rich spike means at a timing when the third exhaust gas sensor issues a predetermined output characteristic indicative of a reduction in the oxygen concentration when the internal combustion engine runs at heavy load.

The exhaust purifying system for an internal combustion engine according to a fourth aspect of the present invention is characterized, in any one of the first to third aspects of the present invention, in that the SCR is an Fe-based zeolite catalyst.

The exhaust purifying system for an internal combustion engine according to a fifth aspect of the present invention is characterized, in any one of the first to fourth aspects of the present invention, by further comprising a second NOx selective catalytic reduction (hereinafter referred to as a "second SCR") disposed downstream of the exhaust gas sensor.

The exhaust purifying system for an internal combustion engine according to a sixth aspect of the present invention is characterized, in the fifth aspect of the present invention, in that the second SCR is an Fe-based zeolite catalyst.

To achieve the foregoing object, a seventh aspect of the present invention provides an exhaust purifying system for an internal combustion engine capable of a lean burn operation. The exhaust purifying system is characterized by including: an NOx storage-reduction catalyst (hereinafter referred to as an "NSR catalyst") disposed in an exhaust passage of the internal combustion engine; an NOx selective catalytic reduction (hereinafter referred to as an "SCR") disposed downstream of the NSR catalyst; a second NOx selective catalytic reduction (hereinafter referred to as a "second SCR") disposed downstream of the SCR; rich spike means for performing a rich spike; and estimating means for estimating an amount of $NH_3$ stored in the second SCR while the rich spike is performed. The exhaust purifying system is characterized in that the rich spike means starts the rich spike at a predetermined timing during a lean burn operation and terminates the rich spike at a timing when the amount of $NH_3$ estimated by the estimating means reaches a predetermined amount.

The exhaust purifying system for an internal combustion engine according to an eighth aspect of the present invention is characterized, in the seventh aspect of the present invention, in that the SCR and the second SCR are Fe-based zeolite catalysts.

Effects of the Invention

When the rich spike is performed, $NH_3$ is produced in the NSR catalyst (NOx storage-reduction catalyst). The produced $NH_3$ is circulated through the exhaust passage and stored in the NOx selective catalytic reduction (SCR) disposed on the downstream side. The SCR selectively reduces NOx that has leaked downstream of the NSR catalyst by using the $NH_3$ stored therein. In the first aspect of the present invention, the rich spike is terminated at the timing when the exhaust gas sensor issues a predetermined output characteristic signal indicative of a rise in the $NH_3$ concentration, specifically, at the timing of blow-by of $NH_3$ downstream of the SCR. The blow-by of $NH_3$ means that the SCR has stored $NH_3$ to the full capacity thereof. By terminating the rich spike at such timing in this aspect of the present invention, therefore, a situation in which the rich spike is excessively performed to aggravate emissions or fuel efficiency can be effectively avoided, while a maximum amount of $NH_3$ can be stored in the SCR.

In the second aspect of the present invention, the first rich spike means is switched to the second rich spike means in which an air-fuel ratio is leaner than that of the first rich spike means at the timing when the second exhaust gas sensor issues a predetermined output characteristic signal indicative of reduction in the oxygen concentration when the internal combustion engine runs at light load, specifically, at the timing when the air-fuel ratio on the upstream side of the NSR catalyst is a predetermined rich air-fuel ratio. When the internal combustion engine runs at light load, a relatively small amount of NOx is discharged. This reduces the necessity of producing a large amount of $NH_3$ for storage in the SCR. Consequently, in this aspect of the present invention, $NH_3$ can be stored in the SCR, while aggravation of HC and CO emissions or fuel efficiency is preferentially inhibited.

In the third aspect of the present invention, the first rich spike means is switched to the second rich spike means in which an air-fuel ratio is leaner than that of the first rich spike means at the timing when the third exhaust gas sensor issues a predetermined output characteristic signal indicative of reduction in the oxygen concentration when the internal combustion engine runs at heavy load, specifically, at the timing when the air-fuel ratio on the downstream side of the NSR catalyst is a predetermined rich air-fuel ratio. When the internal combustion engine runs at heavy load, a relatively large amount of NOx is discharged. This increases the necessity of producing a large amount of $NH_3$ for storage in the SCR. Further, the amount of $NH_3$ produced in the NSR catalyst is greater in the rich spike with a rich air-fuel ratio. Consequently, in this aspect of the present invention, aggravation of HC and CO emissions or fuel efficiency can be inhibited, while $NH_3$ is preferentially stored in the SCR.

In the fourth aspect of the present invention, the Fe-based zeolite is used for the SCR. Consequently, in this aspect of the present invention, the NOx selective reduction performance in the SCR can be effectively enhanced.

Even if the rich spike is terminated at the timing when the exhaust gas sensor issues the predetermined output characteristic signal indicative of a rise in the oxygen concentration, $NH_3$ that represents a portion of transport lag is released downstream of the SCR. In the fifth aspect of the present invention, the second SCR is disposed downstream of the exhaust gas sensor. Consequently, in this aspect of the present invention, the $NH_3$ representing the transport lag portion can be stored in the second SCR, so that aggravation of $NH_3$ emissions can be effectively inhibited.

In the sixth aspect of the present invention, the Fe-based zeolite is used for the second SCR. Consequently, in this aspect of the present invention, the NOx selective reduction performance in the second SCR can be effectively enhanced.

In the seventh aspect of the present invention, the amount of $NH_3$ stored in the second NOx selective catalytic reduction (second SCR) disposed downstream of the SCR is estimated. The rich spike is then terminated at a timing when the estimated amount is the predetermined amount. Consequently, in this aspect of the present invention, $NH_3$ can be effectively stored also in the second SCR, so that NOx purifying capacity can be effectively enhanced.

In the eighth aspect of the present invention, the Fe-based zeolite catalyst is used for the SCR and the second SCR. Consequently, in this aspect of the present invention, the NOx selective reduction performance in the SCR and the second SCR can be effectively enhanced.

BEST MODE FOR CARRYING OUT THE INVENTION

Specific embodiments to which the present invention is applied will be described below with reference to the accompanying drawings. Like or corresponding parts are identified by the same reference numerals in all drawings and descriptions for those parts will be omitted. It is further to be understood that the exemplary embodiments to be described hereunder do not limit the scope of the present invention.

First Embodiment

Arrangements of the First Embodiment

Figure 1:
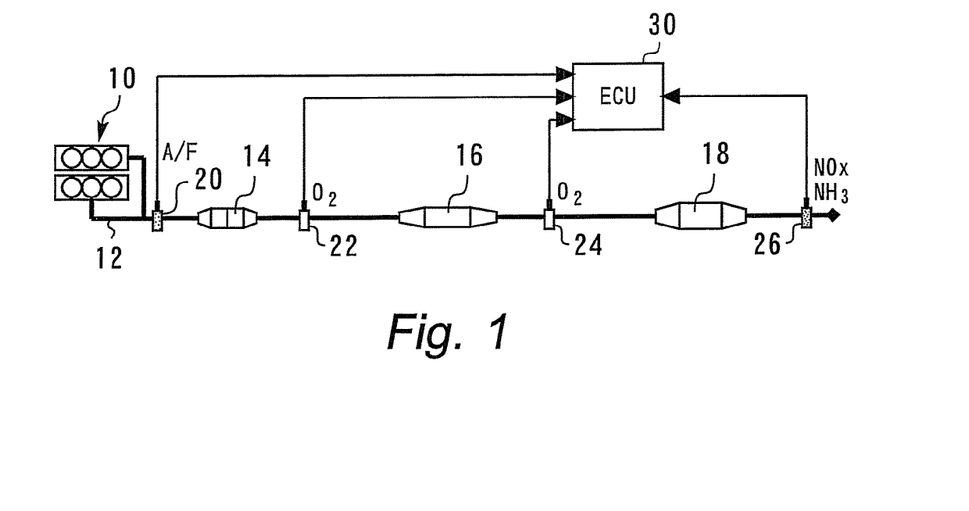
FIG. 1 is a diagram for illustrating arrangements of a first embodiment of the present invention.

FIG. 1 is a diagram for illustrating arrangements of a first embodiment of the present invention. Referring to FIG. 1, a system according to the embodiment of the present invention includes an internal combustion engine (engine) 10. An exhaust passage 12 communicates with an exhaust side of the internal combustion engine 10. A start catalyst (hereinafter referred to as an "SC") 14 as a three-way catalyst is disposed on the exhaust passage 12. An NSR catalyst (NOx storage-reduction catalyst) 16 is disposed downstream of the SC 14 in the exhaust passage 12. Further, a NOx selective catalytic reduction (hereinafter referred to an "SCR") 18 is disposed downstream of the NSR catalyst 16 in the exhaust passage 12.

The internal combustion engine 10 tends to discharge HC and CO when an air-fuel ratio is rich, and tends to discharge NOx when the air-fuel ratio is lean. In a lean environment, the SC 14 reduces NOx (to $N_2$), while adsorbing oxygen ($O_2$). In a rich environment, on the other hand, HC and CO are respectively oxidized to $H_2O$ and $CO_2$, while oxygen is being released. In addition, under the rich environment, nitrogen and hydrogen contained in an exhaust gas react with each other to produce ammonia ($NH_3$).

The NSR catalyst 16 stores NOx contained in the exhaust gas under the lean environment. In addition, the NSR catalyst 16 releases the stored NOx under the rich environment. The NOx released under the rich environment is reduced by HC or CO. At this time, $NH_3$ is produced also in the NSR catalyst 16, as with the SC 14.

The SCR 18 stores $NH_3$ produced under the rich environment by the SC 14 and the NSR catalyst 16 and, under the lean environment, selectively reduces NOx in the exhaust gas by using $NH_3$ as a reducing agent. The SCR 18 can effectively prevent a situation, in which $NH_3$ and NOx that have leaked downstream of the NSR catalyst 16 are released to the atmosphere, from occurring.

The system shown in FIG. 1 includes an air-fuel ratio (A/F) sensor 20 disposed upstream of the SC 14 in the exhaust passage 12. The A/F sensor 20 can detect an exhaust air-fuel ratio of the internal combustion engine 10. The system shown in FIG. 1 further includes oxygen ($O_2$) sensor 22 disposed upstream of the NSR catalyst 16 and downstream of the SC 14, and oxygen sensor 24 disposed downstream of the NSR catalyst 16 and upstream of the SCR 18, in the exhaust passage 12. The $O_2$ sensors 22, 24 generate a signal corresponding to oxygen concentration in the exhaust gas. In addition, a NOx sensor 26 is disposed downstream of the SCR 18 in the exhaust passage 12. The NOx sensor responds to NOx and $NH_3$ in the exhaust gas and thereby generates signals corresponding to concentration thereof. The NOx sensor 26 can therefore detect $NH_3$ concentration under the rich environment and NOx concentration under the lean environment, respectively, on the downstream side of the SCR 18.

The system shown in FIG. 1 includes, as shown in FIG. 1, an ECU (electronic control unit) 30. Actuators of various types including a fuel injection device (not shown) are connected to an output section of the ECU 30. The A/F sensor 20, the $O_2$ sensors 22 and 24, and the NOx sensor 26 mentioned earlier, and various types of other sensors for detecting operating conditions and states of the internal combustion engine 10 are connected to an input section of the ECU 30. The ECU 30 can control states of the system shown in FIG. 1 based on inputted various information.

Operation of the First Embodiment

Rich Spike Control

Figure 2:
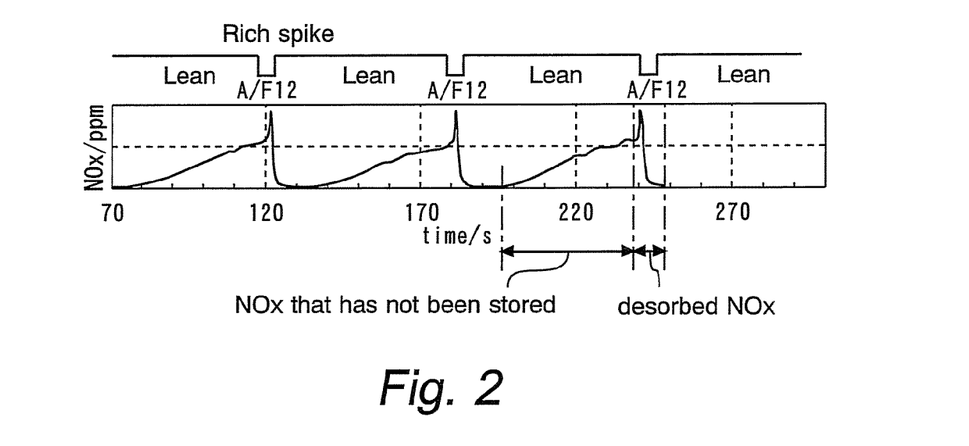
FIG. 2 is a graph showing changes with time in NOx concentration on a downstream side of an NSR catalyst 16.

A basic operation of a rich spike control will be described below with reference to FIGS. 2 and 3. The ECU 30 normally operates the internal combustion engine 10 at a lean air-fuel ratio (a lean operation). During the lean operation, oxidizing agents such as NOx are discharged more than reducing agents such as HC and CO. Accordingly, use of the three-way catalyst for purifying the exhaust gas is not effective in purifying NOx completely due to the insufficient amount of the reducing agents. The system of the first embodiment therefore includes the NSR catalyst 16 in the exhaust passage 12. The NSR catalyst 16 has a function of storing NOx as nitrate salt such as $Ba(NO_3)_2$. The system of the first embodiment can therefore effectively inhibit a situation, in which the NOx is released into the atmosphere, even during the lean operation.

The NOx storage performance of the NSR catalyst 16 is, however, degraded as a storage amount increases. If the lean operation is run for a long time, therefore, part of NOx that has not been stored leaks downstream of the catalyst. FIG. 2 is a graph showing changes with time in NOx concentration on the downstream side of the NSR catalyst 16. As shown in this figure, amount of blow-by of Nox that has not been stored by the NSR catalyst 16 gradually increases during the lean operation, due to the NOx storage performance being degraded.

The system of the first embodiment therefore performs the rich spike control in which NOx stored in the NSR catalyst 16 is desorbed at regular intervals. More specifically, referring to FIG. 2, the exhaust air-fuel ratio of the internal combustion engine 10 is temporarily made rich (e.g. A/F=12) at a predetermined timing when the storage performance of the NSR catalyst 16 is degraded.

Figure 3:
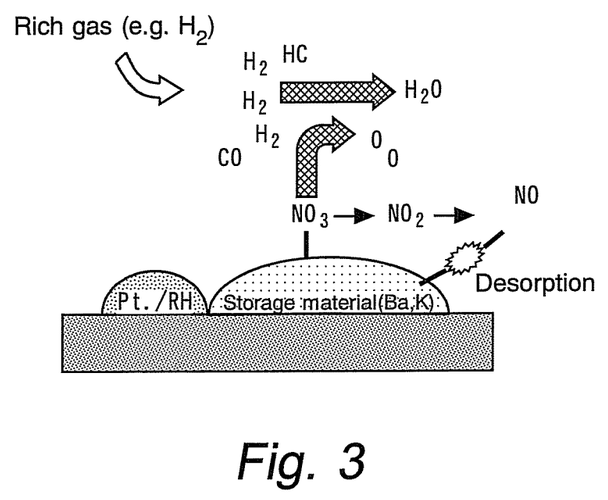
FIG. 3 is a diagram for illustrating a desorption phenomenon of a stored NOx when rich spike is performed.

FIG. 3 is a diagram for illustrating a desorption phenomenon of the stored NOx when the rich spike is performed. As shown in this figure, the exhaust gas during the performance of the rich spike contains a large amount of reducing agents such as HC, CO, and $H_2$. Consequently, when these reducing agents are introduced into the NSR catalyst 16, the NOx stored as the nitrate salt is reduced to NO and desorbed from a base. The desorbed NOx is purified on the catalyst within the NSR catalyst 16 to, for example, $N_2$. As described above, the performance of the rich spike during the lean operation allows NOx stored in the NSR catalyst 16 to be desorbed, so that the NOx storage performance can be effectively recovered.

(Function and Operation of the SCR 18)

As described above, the NOx storage performance of the NSR catalyst 16 can be effectively recovered by the performance of the rich spike. Referring to FIG. 2, however, there exists NOx that leaks downstream of the NSR catalyst 16 during the performance of the rich spike. This represents NOx that, after having been desorbed from the NSR catalyst 16, is left unpurified on the catalyst and leaks downstream of the catalyst as is. In addition, there also exists, as described earlier, NOx that leaks downstream of the NSR catalyst 16 before the performance of the rich spike. If the blow-by of NOx of these kinds is released into the atmosphere as is, aggravation of emissions is invited.

The system of the first embodiment is therefore adapted to include the SCR 18 that treats NOx that has leaked downstream of the NSR catalyst 16. As described earlier, the SCR 18 stores thereinside $NH_3$ produced under the rich environment by the SC 14 and the NSR catalyst 16. The SCR 18 can therefore selectively reduce and purify NOx that has leaked downstream of the NSR catalyst 16 by using $NH_3$, thereby effectively inhibiting such a situation as the emissions are aggravated due to release of NOx into the atmosphere.

Figure 4:
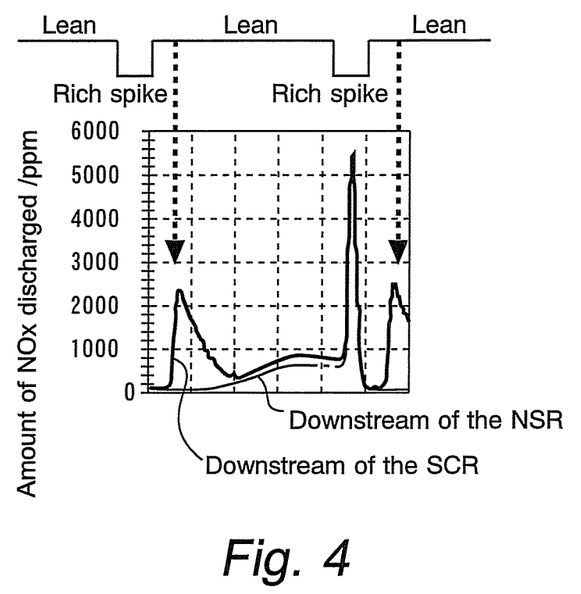
FIG. 4 is a graph showing an amount of NOx discharged downstream of an SCR 18 and downstream of the NSR catalyst 16.

Various types of materials may be used for the SCR 18. The inventor of this application has therefore studied SCR materials that can efficiently store $NH_3$. FIG. 4 is a graph showing an amount of NOx discharged downstream of the SCR 18 and downstream of the NSR catalyst 16. Note that Ag-based zeolite is used for the SCR 18. As shown in this figure, the amount of NOx discharged downstream of the SCR 18 increases sharply during the lean operation after the rich spike. From a point of view by the inventor of the application, a reversible reaction shown below probably occurs in the SCR 18, so that the stored $NH_3$ is reversed to NOx again.

$$NH_3 + O_2 \rightarrow NOx \tag{1}$$

As a result of studies conducted by preparing various types of materials, the inventor of the application has found that the abovementioned reversible reaction is less likely to occur with the SCR 18 using Fe-based zeolite. The system of the first embodiment accordingly uses the SCR 18 using the Fe-based zeolite. This inhibits the abovementioned reversible reaction from occurring, so that the SCR 18 can store $NH_3$ well.

Researches made by the inventor of the application into reduction performance of the SCR 18 at various floor temperatures have revealed that a reduction reaction in the SCR 18 actively takes place with a floor temperature of the SCR 18 at 500° C. or less, preferably, at around 300° C. In the system of the first embodiment, therefore, the SCR 18 is appropriately disposed such that the floor temperature of the SCR 18 is around 300° C. This effectively inhibits a situation, in which NOx is released downstream of the SCR 18, from occurring.

Characteristic Operations of the First Embodiment

Characteristic operations of the first embodiment will be described below with reference to FIGS. 5(A) and 5(B), or FIG. 6. As described earlier, $NH_3$ is produced in the SC 14 and the NSR catalyst 16 (particularly, in the NSR catalyst 16) under the rich environment, specifically, during the performance of the rich spike. The produced $NH_3$ is introduced to the SCR 18 disposed downstream of the NSR catalyst 16 and stored thereinside. The stored $NH_3$ is used for selectively reducing NOx that has leaked downstream of the NSR catalyst 16. Preferably, therefore, the SCR 18 stores therein a necessary and sufficient amount of $NH_3$. Making a period of time through which the rich spike is to be performed blindly long, however, poses a problem of aggravated emissions or fuel efficiency.

In order to achieve both storage of $NH_3$ in the SCR 18 and inhibition of aggravated emissions, the system of the first embodiment controls the air-fuel ratio and a timing of the rich spike according to the operating state of the internal combustion engine 10. FIGS. 5(A) and 5(B) are diagrams for illustrating the rich spike control performed in the first embodiment of the present invention. FIG. 5(A) shows the control performed when the internal combustion engine 10 runs at light load. FIG. 5(B) shows the control performed when the internal combustion engine 10 runs at heavy load.

The rich spike control, when the internal combustion engine 10 runs at light load, will first be described. When the internal combustion engine 10 runs at light load, the amount of NOx contained in the exhaust gas is relatively small. Thus, only a slight amount of NOx flows up to the SCR 18 without being stored in the NSR catalyst 16, so that it is assumed that the amount of $NH_3$ consumed in the SCR 18 is not so much.

Figure 5A:
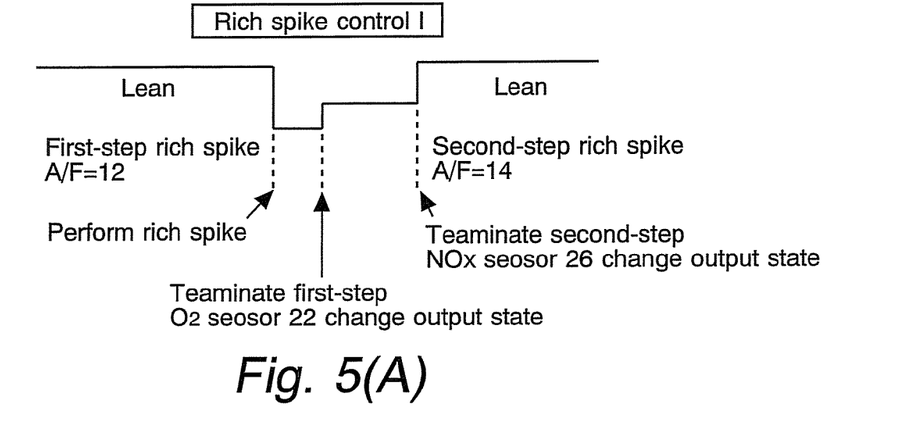
FIGS. 5(A) and 5(B) are diagrams for illustrating a rich spike control performed in the first embodiment of the present invention.
Figure 5B:
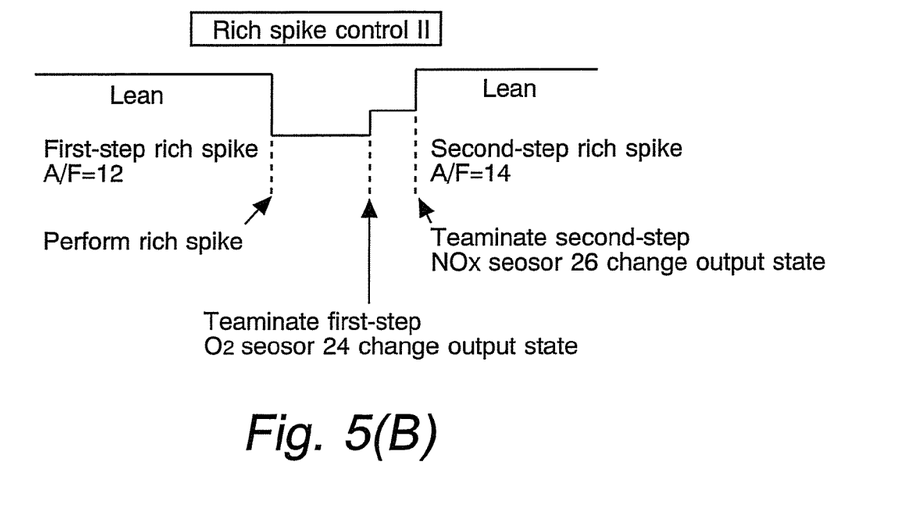

When the internal combustion engine 10 runs at light load, a rich spike as shown in FIG. 5(A) is therefore performed. Specifically, the rich spike is terminated at a timing of change of an output from the NOx sensor 26. As described earlier, the NOx sensor 26 responds to NOx and $NH_3$. Undeniably, the exhaust air-fuel ratio is rich during the performance of the rich spike, so that NOx in the exhaust gas is purified by a three-way catalytic function of the SC 14 and the NSR catalyst 16. Consequently, when the NOx sensor 26 changes the output state therefrom during the performance of the rich spike, it means that not NOx but $NH_3$ has leaked downstream of the SCR 18. The blow-by of $NH_3$ means that the SCR 18 has adsorbed $NH_3$ to the full capacity thereof. By terminating the rich spike at the timing of change of the output from the NOx sensor 26, therefore, the rich spike can be inhibited from being excessively performed, while a maximum amount of $NH_3$ to be adsorbed by the SCR 18 is ensured.

Referring again to FIG. 5(A), when the engine runs at light load, the rich spike control varies the rich spike air-fuel ratio in a stepwise fashion. More specifically, after a first-step rich spike (e.g. A/F=12) is performed, a second-step rich spike with an air-fuel ratio leaner than the first-step rich spike (e.g. A/F=14) is performed. This is done to avoid aggravation of CO and HC emissions or fuel efficiency as otherwise caused by continued performance of a fuel-rich rich spike. The first-step rich spike is switched to the second-step rich spike at a timing of change of the output from the $O_2$ sensor 22. This results in the second-step rich spike being mainly introduced to the NSR catalyst 16, so that $NH_3$ can be stored in the SCR 18, while aggravation of emissions caused by blow-by of HC or CO is preferentially inhibited.

The rich spike control, when the internal combustion engine 10 runs at heavy load, will next be described. When the internal combustion engine 10 runs at heavy load, the amount of NOx contained in the exhaust gas is relatively large. Thus, a relatively large amount of blow-by of NOx leaks up to the SCR 18 without being stored in the NSR catalyst 16, so that it is assumed that a large amount of $NH_3$ is consumed in the SCR 18.

Specifically, when the internal combustion engine 10 runs at heavy load, it is required that a large amount of $NH_3$ be produced during the performance of the rich spike to thereby achieve efficient storage. The inventors of the application have investigated into a relationship between the rich spike and the amount of $NH_3$ produced and found that a greater amount of $NH_3$ is produced in the SC 14 and the NSR 16 (particularly, in the NSR 16) in a short and rich rich spike than in a long and lean rich spike even with the same amount of rich spike.

By using the above characteristic, when the internal combustion engine 10 runs at heavy load, the first-step rich spike is performed for a period of time longer than that when the engine runs at light load. More specifically, as shown in FIG. 5(B), the first-step rich spike is switched to the second-step rich spike at a timing of change of the output from the $O_2$ sensor 24. This ensures that the first-step rich spike continues until the exhaust air-fuel ratio on the downstream side of the NSR catalyst 16 changes from lean to rich, so that the exhaust gas mainly from the first-step rich spike can be introduced into the NSR catalyst 16. This allows a large amount of $NH_3$ to be produced, so that the SCR 18 can store therein a large amount of $NH_3$.

Additionally, when the internal combustion engine 10 runs at heavy load, the rich spike is terminated at the timing of change of the output from the NOx sensor as with the case where the engine runs at light load described above. Thus, the rich spike can be inhibited from being excessively performed, while a maximum amount of $NH_3$ to be adsorbed by the SCR 18 is ensured.

Specific Operations in the First Embodiment

Figure 7:
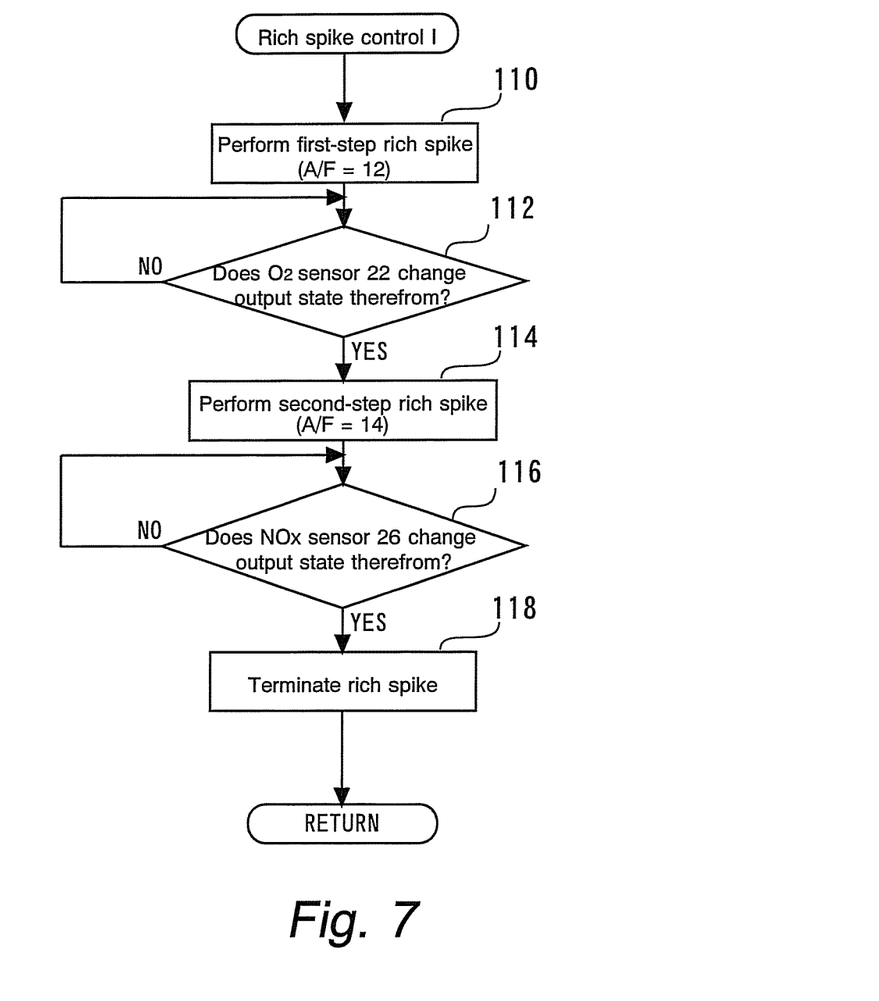
FIG. 7 is a flow chart showing a routine performed in the first embodiment of the present invention.
Figure 8:
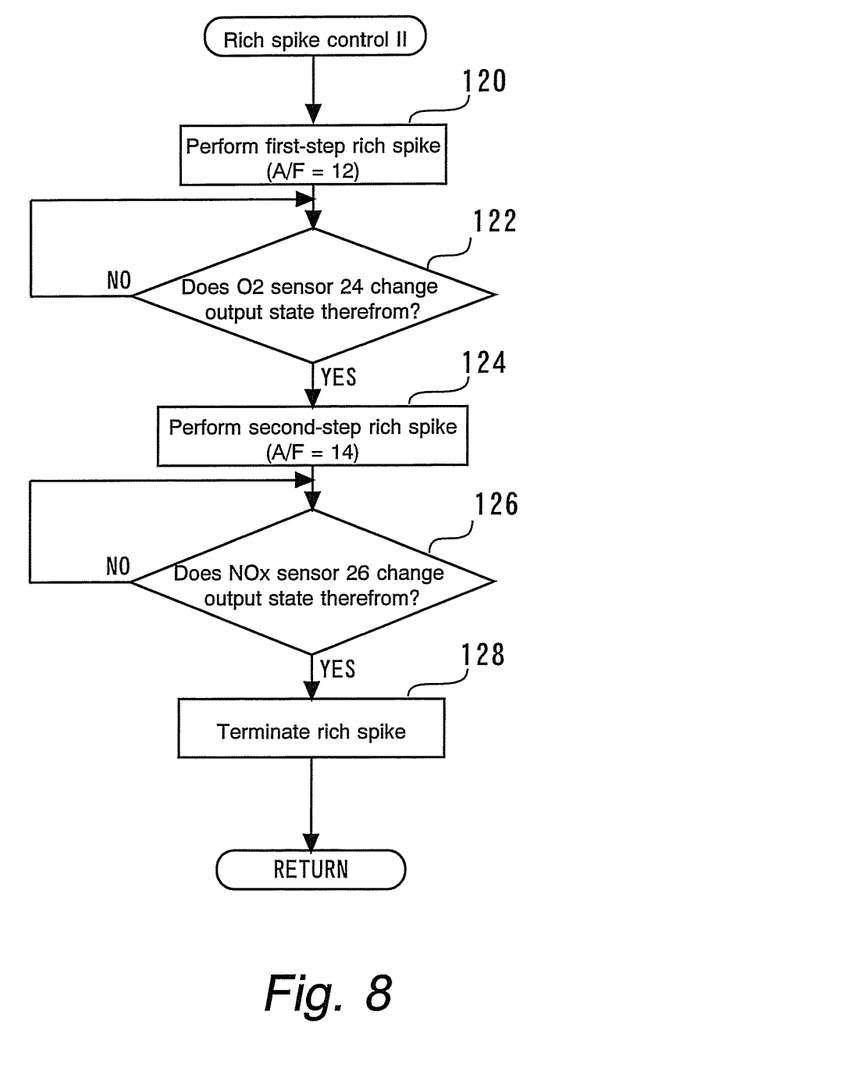
FIG. 8 is a flow chart showing a routine performed in the first embodiment of the present invention.

Specific operations performed in this embodiment will be described below with reference to FIG. 6. FIG. 6 is a flow chart showing a routine through which the ECU 30 performs the rich spike. FIG. 7 is a flow chart showing a routine of rich spike control I performed in step 104 of FIG. 6. Further, FIG. 8 is a flow chart showing a routine of rich spike control II performed in step 106 of FIG. 6. Note that the routine shown in FIG. 6 is to be performed repeatedly during the lean operation of the internal combustion engine 10.

Figure 6:
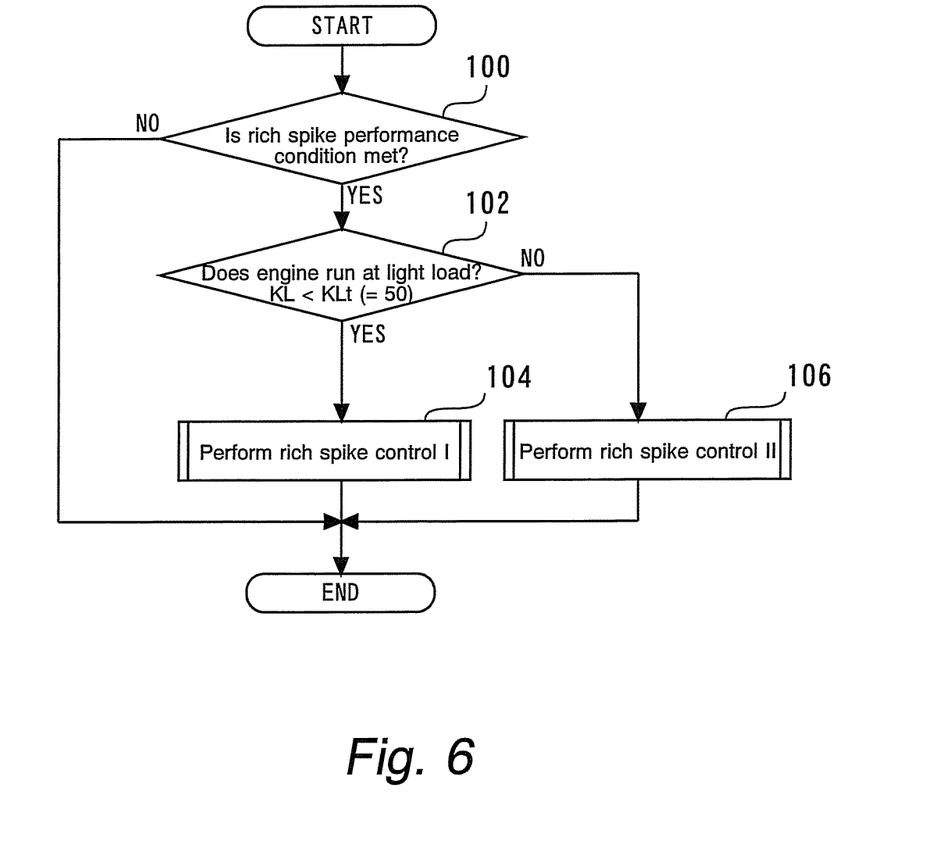
FIG. 6 is a flow chart showing a routine performed in the first embodiment of the present invention.

In the routine shown in FIG. 6, it is first determined whether or not a condition for performing the rich spike is met (step 100). Specifically, it is herein determined whether or not a predetermined period of time elapses since the performance of a preceding rich spike control. When, as a result, it is determined that the condition for performing the rich spike is not met, this routine is quickly terminated.

When it is determined in step 100, on the other hand, that the condition for performing the rich spike is met, the operation proceeds to a subsequent step and it is determined whether or not the internal combustion engine 10 runs at light load (step 102). Specifically, herein, an engine load KL is first calculated based on detection signals by the various sensors that detect the operating state of the internal combustion engine 10. It is then determined whether or not the engine load KL is smaller than a predetermined reference value $KL_t$ (e.g. $KL_t=50$).

When it is determined in step 102 that $KL<KL_t$ holds true, it is then determined that the internal combustion engine 10 runs at predetermined light load. The operation then proceeds to a subsequent step and rich spike control I is performed (step 104). In step 104, the routine shown in FIG. 7 is started.

In the routine shown in FIG. 7, the first-step rich spike control is first performed (step 110). Specifically, the fuel injection device is herein controlled such that the exhaust air-fuel ratio of the internal combustion engine 10 is a predetermined rich air-fuel ratio (e.g. A/F=12). It is then determined whether or not the $O_2$ sensor 22 changes the output state therefrom (step 112). When it is determined, as a result, that the $O_2$ sensor 22 does not change the output state therefrom, it is determined that the air-fuel ratio on the upstream side of the NSR catalyst 16 is still lean, and the operation of this step is repeatedly performed.

When it is determined in step 112, on the other hand, that the $O_2$ sensor 22 changes the state therefrom, it is determined that the air-fuel ratio on the upstream side of the NSR catalyst 16 changes from lean to rich. The operation proceeds to a subsequent step and the second-step rich spike controll is performed (step 114). Specifically, the rich spike exhaust air-fuel ratio is herein changed to one leaner than that of the first-step rich spike (e.g. A/F=14).

In the routine shown in FIG. 7, it is next determined whether or not the NOx sensor 26 changes the output state therefrom (step 116). When it is determined, as a result, that the NOx sensor 26 does not change the output state therefrom, it is determined that $NH_3$ is yet to leak downstream of the SCR 18, and the operation of this step is repeatedly performed.

When it is determined, on the other hand, that the NOx sensor 26 changes the output state therefrom, it is determined that $NH_3$ that has not been stored leaks downstream of the SCR 18. The operation proceeds to a subsequent step and the rich spike control is terminated (step 118). Specifically, the air-fuel ratio of the internal combustion engine 10 is herein controlled to that of an ordinary lean operation. The routine shown in FIG. 7 is then terminated.

When it is determined, on the other hand, in step 102 of the routine shown in FIG. 6 that $KL<KL_t$ does not hold true, it is determined that the internal combustion engine 10 runs at predetermined heavy load. The operation then proceeds to a subsequent step and rich spike control II is performed (step 106). In step 106, the routine shown in FIG. 8 is started.

In the routine shown in FIG. 8, the first-step rich spike control is first performed (step 120). Specifically, the same operation as that in step 110 is herein performed. It is then determined whether or not the $O_2$ sensor 24 changes the output state therefrom (step 122). When it is determined, as a result, that the $O_2$ sensor 24 does not change the output state therefrom, it is determined that the air-fuel ratio on the downstream side of the NSR catalyst 16 is still lean and the operation of this step is repeatedly performed.

When it is determined in step 122, on the other hand, that the $O_2$ sensor 24 changes the output state therefrom, it is determined that the air-fuel ratio on the downstream side of the NSR catalyst 16 changes from lean to rich. The operation proceeds to a subsequent step, and the second-step rich spike is performed (step 124). It is next determined whether or not the NOx sensor 26 changes the output state therefrom (step 126). Specifically, the same operations as those in steps of from steps 114 to 116 are herein performed. When it is determined, as a result, that the NOx sensor 26 does not change the output state therefrom, it is determined that $NH_3$ is yet to leak downstream of the SCR 18, and the operation of this step is repeatedly performed.

When it is determined in step 126, on the other hand, that the NOx sensor 26 changes the output state therefrom, it is determined that $NH_3$ that has not been stored leaks downstream of the SCR 18. The operation proceeds to a subsequent step and the rich spike control is terminated (step 128). Specifically, the same operation as that in step 118 is herein performed. The routine shown in FIG. 8 is then terminated.

As described heretofore, in the system of the first embodiment, the rich spike is terminated at the timing of change of the output state from the NOx sensor 26. This ensures that a maximum amount of $NH_3$ can be stored in the SCR 18 and the rich spike can be inhibited from being excessively performed.

Additionally, in the system of the first embodiment, the rich spike air-fuel ratio is switched from the first step to the second step at the timing of change of the output from the $O_2$ sensor 22, when the internal combustion engine 10 runs at light load. This inhibits a situation in which the first-step rich spike is introduced to the NSR catalyst 16, thereby effectively inhibiting such a situation as the emissions are aggravated due to CO or HC leakage downstream of the NSR catalyst 16.

Additionally, in the system of the first embodiment, the rich spike air-fuel ratio is switched from the first step to the second step at the timing of change of the output from the $O_2$ sensor 24, when the internal combustion engine 10 runs at heavy load. This allows a large amount of $NH_3$ to be produced in the NSR catalyst 16, so that a large amount of $NH_3$ can be efficiently stored in the SCR 18.

In the above-described first embodiment, the rich spike is terminated at the timing of change of the output from the NOx sensor 26. This timing is not, however, limited only to the case in which the output state is changed. Specifically, any other timing may be employed as long as an output characteristic signal indicating that $NH_3$ has leaked downstream of the SCR 18 is developed at such a timing during the performance of the rich spike. In addition, the timing of switching the first-step rich spike control to the second-step rich spike control is not limited only to the case in which the output states of the $O_2$ sensors 22 and 24 are changed. Specifically, any other timing may be employed as long as an output characteristic signal indicating that the air-fuel ratio becomes rich is developed at such a timing during the performance of the rich spike.

Note that, in the above-described first embodiment, the NSR catalyst 16 corresponds to the "NSR catalyst" in the first aspect of the present invention, the SCR 18 corresponds to the "SCR" in the first aspect of the present invention, and the NOx sensor 26 corresponds to the "exhaust gas sensor" in the first aspect of the present invention. In addition, in the above-described first embodiment, the ECU 30 performs the operation of step 104 or 106, thereby achieving the "rich spike means" in the first aspect of the present invention.

Additionally, in the above-described first embodiment, the SC 14 corresponds to the "three-way catalyst" in the second aspect of the present invention, and the $O_2$ sensor 22 corresponds to the "second exhaust gas sensor" in the second aspect of the present invention. In addition, in the above-described first embodiment, the ECU 30 performs: the operation of step 110, thereby achieving the "first rich spike means" in the second aspect of the present invention; the operation of step 114, thereby achieving the "second rich spike means" in the second aspect of the present invention; and the operation of step 112, thereby achieving the "switchover means" in the second aspect of the present invention.

Additionally, in the above-described first embodiment, the $O_2$ sensor 24 corresponds to the "third exhaust gas sensor" in the third aspect of the present invention. Further, the ECU 30 performs: the operation of step 120, thereby achieving the "first rich spike means" in the third aspect of the present invention; the operation of step 124, thereby achieving the "second rich spike means" in the third aspect of the present invention; and the operation of step 122, thereby achieving the "switchover means" in the third aspect of the present invention.

Second Embodiment

Characteristics of the Second Embodiment

Figure 9:
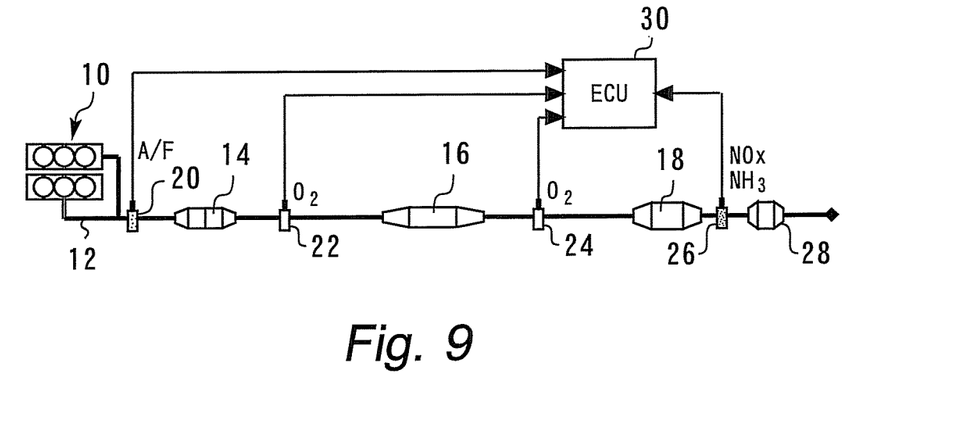
FIG. 9 is a diagram for illustrating arrangements of a second embodiment of the present invention.

A second embodiment of the present invention will be described below with reference to FIG. 9. FIG. 9 is a diagram for illustrating arrangements of the second embodiment of the present invention. In a system shown in FIG. 9, like or corresponding parts are identified by the same reference numerals as those used for the first embodiment of the present invention and descriptions for those parts will be omitted.

Referring to FIG. 9, the system of this embodiment includes another SCR 28 on a downstream side of a NOx sensor 26 in an exhaust passage 12. The SCR 28 uses the Fe-based zeolite as with the SCR 18. In addition, the SCR 28 is formed to have a smaller capacity than the SCR 18 does.

In the above-described first embodiment, the rich spike is terminated at the timing of change of the output from the NOx sensor 26. A maximum amount of $NH_3$ can thereby be stored in the SCR 18 and the rich spike can thereby be inhibited from being excessively performed. Even if the rich spike is terminated at such a timing, however, $NH_3$ that represents a portion of transport lag thereafter leaks through the SCR 18 and is released into the atmosphere.

In this respect, in the system of the second embodiment, the SCR 28 traps the $NH_3$ representing the transport lag portion that has leaked through the SCR 18, thereby effectively inhibiting a situation in which the $NH_3$ representing the transport lag portion is released into the atmosphere immediately after the end of the rich spike.

In the above-described second embodiment, the SCR 28 corresponds to the "second SCR" in the fifth aspect of the present invention.

Third Embodiment

Characteristics of the Third Embodiment

A third embodiment of the present invention will be described below with reference to FIGS. 10 to 12. The third embodiment is achieved by use of the system shown in FIG. 9 that performs routine shown in FIG. 11 in rich spike control I shown in FIG. 6 and routine shown in FIG. 12 in rich spike control II shown in FIG. 6.

As described earlier, a large amount of NOx is discharged when the internal combustion engine 10 runs at heavy load. Thus, NOx which the NSR 16 fails to treat leaks downstream of the catalyst, so that a large amount of NOx may blow into the SCR 18. It is expected, in this case, that the SCR 18 has an insufficient amount of $NH_3$ stored therein depending on the capacity thereof.

The above-described system of the second embodiment includes the additional SCR 28 disposed downstream of the SCR 18 as shown in FIG. 9. The SCR 28 in the system of the second embodiment is used as a buffer for trapping the $NH_3$ representing the transport lag portion after the rich spike. Consequently, in the system of the second embodiment, the SCR 28 is not actively used as a catalyst for purifying NOx.

A system of the third embodiment therefore lets the SCR 28 actively adsorb $NH_3$ to use the SCR 28 actively for purifying NOx. More specifically, a rich spike time is extended for a predetermined period of time to thereby allow a predetermined amount of $NH_3$ to be stored within the range of capacity of the SCR 28. This allows $NH_3$ to be effectively stored in the SCR 28, while inhibiting $NH_3$ from being released downstream of the SCR 28.

In order to allow a predetermined amount of $NH_3$ to be stored in the SCR 28, it becomes necessary to identify the amount of $NH_3$ that blows into the SCR 28. In the third embodiment, a map shown in FIG. 10 is used to estimate the amount of $NH_3$ that flows into the SCR 28. The map shown in FIG. 10 shows a relationship between an exhaust air-fuel ratio and an $NH_3$ concentration. The map allows the $NH_3$ concentration to be specifically determined based on the exhaust gas air-fuel ratio. The amount of exhaust gas herein can be calculated based on the engine load KL of the internal combustion engine 10. Thus, the amount of $NH_3$ that flows into the SCR 28 can be estimated based on the specifically determined $NH_3$ concentration and the amount of exhaust gas.

A rich spike extension time T required for the predetermined amount of $NH_3$ to be stored in the SCR 28 can be calculated based on the estimated amount of $NH_3$. In the system of the third embodiment, therefore, the rich spike is terminated after the lapse of the extension time T since the introduction of $NH_3$ into the SCR 28 after changing the output state of the NOx sensor 26 during the performance of the rich spike. This allows the rich spike to be terminated with the predetermined amount of $NH_3$ stored in the SCR 28.

Specific Operations in the Third Embodiment

Specific operations to be performed in this embodiment will be described below with reference to FIGS. 11 and 12. FIG. 11 is a flow chart showing a routine of rich spike control I performed in step 104 of FIG. 6. FIG. 12 is a flow chart showing a routine of rich spike control II performed in step 106 of FIG. 6. The routine shown in FIG. 6 has been described with reference to the first embodiment and will thus be omitted.

Figure 11:
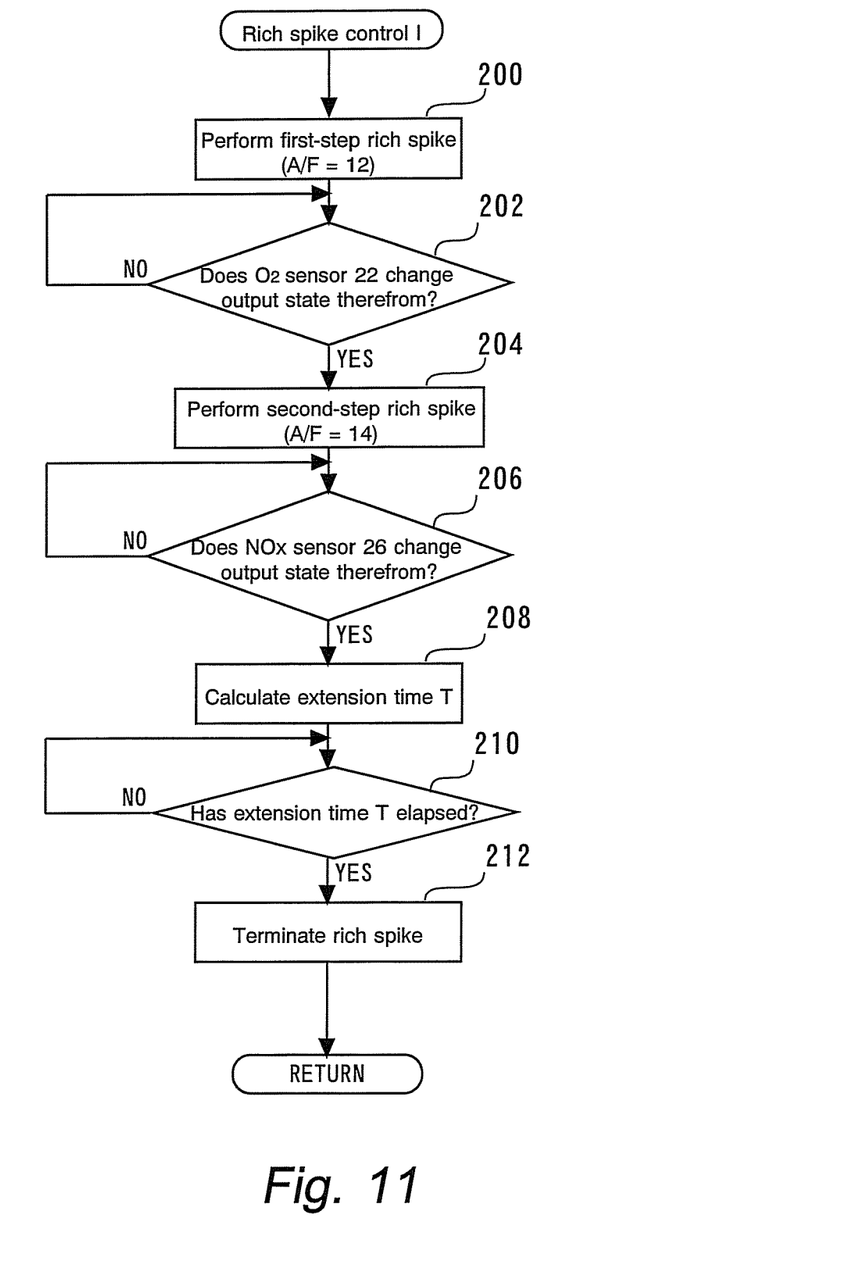
FIG. 11 is a flow chart showing a routine performed in a third embodiment of the present invention.

When the operation proceeds to step 104 in the routine shown in FIG. 6, the routine shown in FIG. 11 is started. In the routine shown in FIG. 11, the first-step rich spike control is first performed (step 200). It is next determined whether or not the output state of the $O_2$ sensor 22 is changed (step 202). Specifically, the same operations as in steps of from steps 110 to 112 are herein performed. When it is determined, as a result, that the output state of the $O_2$ sensor 22 is not changed, the operation of this step is repeatedly performed. When it is determined in step 202, on the other hand, that the output state of the $O_2$ sensor 22 is changed, the second-step rich spike control is performed (step 204). It is then determined whether or not the output state of the NOx sensor 26 is changed (step 206). Specifically, the same operations as in steps of from steps 114 to 116 are herein performed. When it is determined, as a result, that the output state of the NOx sensor 26 is not changed, it is determined that $NH_3$ is yet to leak downstream of the SCR 18 and the operation of this step is repeatedly performed.

When it is determined in step 206, on the other hand, that the output state of the NOx sensor 26 is changed, it is determined that $NH_3$ that has not been stored leaks downstream of the SCR 18. The operation proceeds to a subsequent step and the rich spike extension time T is calculated (step 208). Specifically, the concentration of $NH_3$ is herein first calculated. The ECU 30 stores in memory the map shown in FIG. 10. Herein, the concentration of $NH_3$ corresponding to the exhaust air-fuel ratio is identified in accordance with the map. Next, a flow rate of the exhaust gas is calculated based on the engine load of the internal combustion engine 10. Then, based on the $NH_3$ concentration and the exhaust gas flow rate thus obtained, the amount of $NH_3$ flowing into the SCR 28 is calculated. Next, based on the amount of $NH_3$ flowing into the SCR 28, the rich spike extension time T required for the predetermined amount of $NH_3$ to be stored is calculated.

Next, it is determined whether or not the rich spike extension time T elapses (step 210). Herein, it is determined whether or not the extension time T calculated in step 208 elapses since it is determined in step 206 that the output state of the NOx sensor 26 is changed. When it is determined, as a result, that the extension time T is yet to elapse, this step is repeatedly performed.

When, on the other hand, it is determined in step 210 that the rich spike extension time T elapses, the operation proceeds to a subsequent step and the rich spike control is terminated (step 212) to complete the routine shown in FIG. 11.

Figure 12:
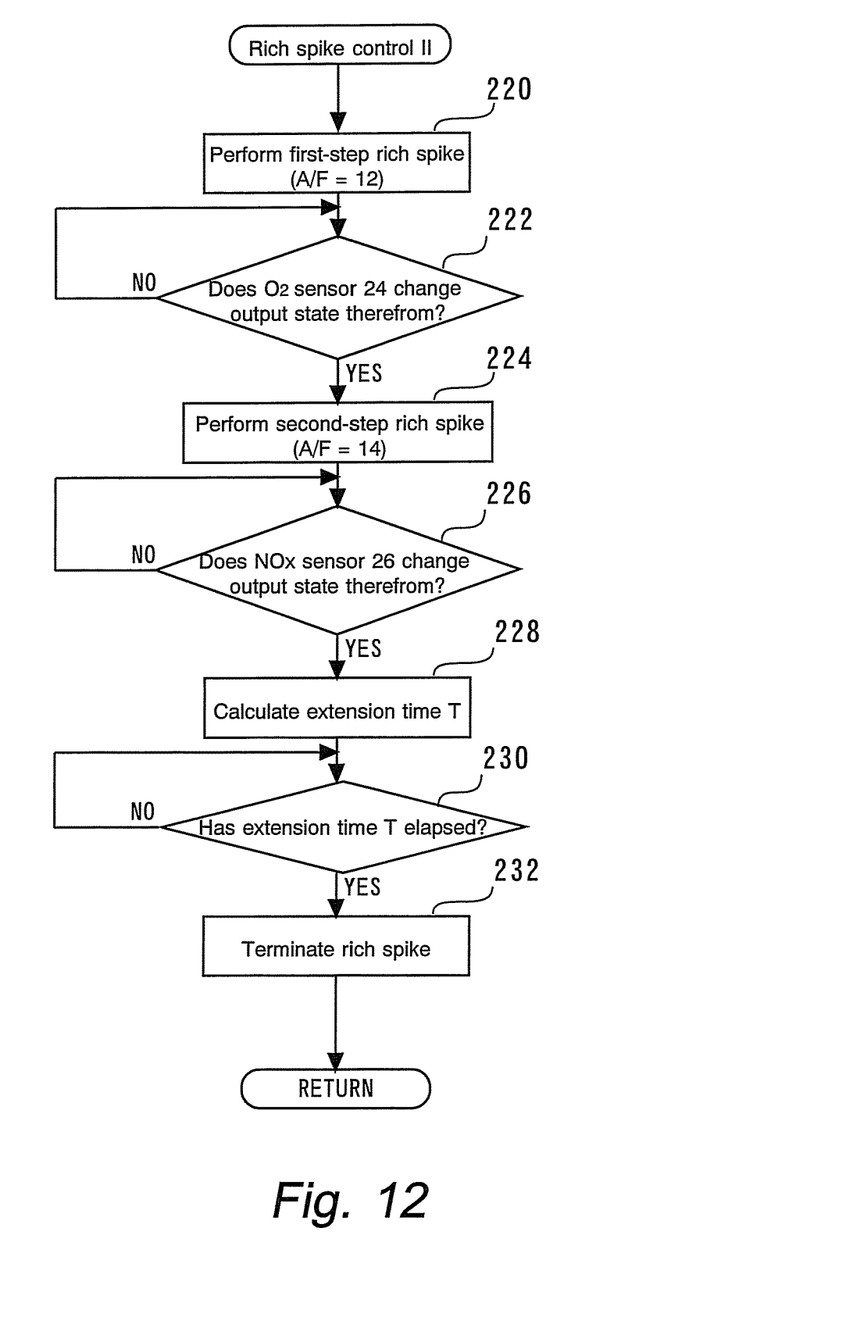
FIG. 12 is a flow chart showing a routine performed in the third embodiment of the present invention.

When, on the other hand, the operation proceeds to step 106 in the routine shown in FIG. 6, the routine shown in FIG. 12 is started. In the routine shown in FIG. 12, the first-step rich spike control is first performed (step 220). It is next determined whether or not the output state of the $O_2$ sensor 24 is changed (step 222). Specifically, the same operations as in steps of from steps 120 to 122 are herein performed. When it is determined, as a result, that the output state of the $O_2$ sensor 24 is not changed, the operation of this step is repeatedly performed. When it is determined in step 222, on the other hand, that the output state of the $O_2$ sensor 24 is changed, the second-step rich spike control is performed (step 224). It is then determined whether or not the output state of the NOx sensor 26 is changed (step 226). Specifically, the same operations as in steps of from steps 124 to 126 are herein performed. When it is determined, as a result, that the output state of the NOx sensor 26 is not changed, it is determined that $NH_3$ is yet to leak downstream of the SCR 18 and the operation of this step is repeatedly performed.

When it is determined in step 226, on the other hand, that the output state of the NOx sensor 26 is changed, it is determined that $NH_3$ that has not been stored leaks downstream of the SCR 18. The operation proceeds to a subsequent step and the rich spike extension time T is calculated (step 228). Specifically, the same operation as in step 208 is herein performed. It is next determined whether or not the rich spike extension time T elapses (step 230). Specifically, the same operation as in step 210 is herein performed. When, as a result, the extension time T is yet to elapse, this step is repeatedly performed.

When it is determined in step 220, on the other hand, that the rich spike extension time T elapses, the operation proceeds to a subsequent step and the rich spike control is terminated (step 232) to complete the routine shown in FIG. 12.

As described heretofore, in the system of the third embodiment, the timing of termination of the rich spike is extended, so that the predetermined amount of $NH_3$ can be stored in the SCR 28. This allows a total amount of $NH_3$ stored in the SCR 18 and the SCR 28 to be effectively increased, so that a situation in which NOx that is yet to be purified is released into the atmosphere can be effectively inhibited even if a large amount of NOx is discharged.

Additionally, in the system of the third embodiment, $NH_3$ is stored in the SCR 28 within the range of capacity of the SCR 28, thereby effectively inhibiting a situation in which $NH_3$ that the SCR 28 fails to store leaks downstream.

Figure 10:
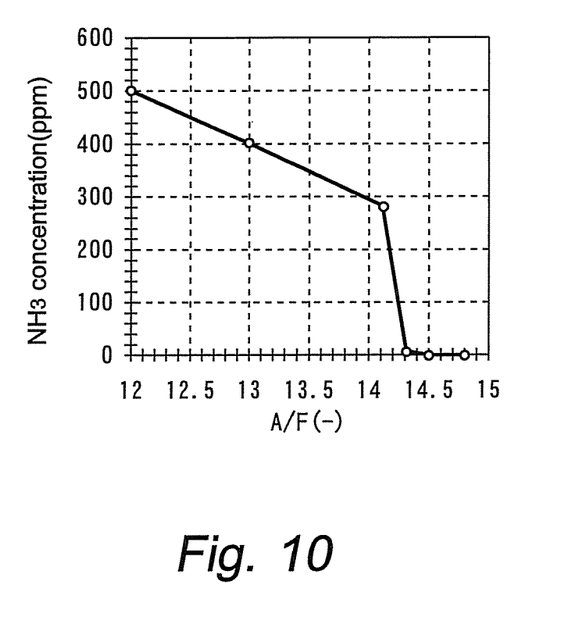
FIG. 10 is a map showing a relationship between an exhaust air-fuel ratio and an $NH_3$ concentration.

In the above-described the third embodiment, the $NH_3$ concentration is identified in accordance with the map specified in FIG. 10 and the amount of $NH_3$ to be stored in the SCR 28 is estimated by using the identified $NH_3$ concentration. This is, however, not the only possible method for estimating the amount of $NH_3$. Specifically, a sensor that can detect the NH₃ concentration may be disposed downstream of the NSR catalyst 16 and the sensor is used to directly detect the amount of NH₃ for estimating the amount of NH₃. Alternatively, other well-known techniques may be employed to estimate the amount of NH₃ stored in the SCR 28.

In the above-described third embodiment, the NSR catalyst 16 corresponds to the "NSR catalyst" in the seventh aspect of the present invention, the SCR 18 corresponds to the "SCR" in the seventh aspect of the present invention, and the SCR 28 corresponds to the "second SCR" in the seventh aspect of the present invention. In addition, in the above-described third embodiment, the ECU 30 performs: the operation of step 104 or 106, thereby achieving the "rich spike means" in the seventh aspect of the present invention; and the operation of step 208, thereby achieving the "estimating means" in the seventh aspect of the present invention.

DESCRIPTION OF REFERENCE CHARACTERS

10: internal combustion engine (engine)
12: exhaust passage
14: start catalyst (SC)
16: NOx storage-reduction catalyst (NSR catalyst)
18: NOx selective catalytic reduction (SCR)
20: A/F sensor
22: O₂ sensor
24: O₂ sensor
26: NOx sensor
28: NOx selective catalytic reduction (SCR)
30: ECU (electronic control unit)

The invention claimed is:

1. An exhaust purifying system for an internal combustion engine capable of a lean burn operation, the exhaust purifying system comprising:
   an NOx storage-reduction catalyst (hereinafter referred to as an "NSR catalyst") disposed in an exhaust passage of the internal combustion engine;
   an NOx selective catalytic reduction (hereinafter referred to as an "SCR") disposed downstream of the NSR catalyst;
   an exhaust gas sensor disposed downstream of the SCR, the exhaust gas sensor producing an output according to an NH₃ concentration;
   an electric control unit programmed to perform a rich spike, wherein the electric control unit is further programmed to start the rich spike at a predetermined timing during a lean burn operation and terminates the rich spike at a timing when the exhaust gas sensor issues a predetermined output characteristic indicative of a rise in the NH₃ concentration;
   a second exhaust gas sensor disposed downstream of the NSR catalyst and upstream of the SCR, the second exhaust gas sensor producing an output according to the oxygen concentration,
   wherein the electric control unit is further programmed to:
   perform a first rich spike at a predetermined air-fuel ratio;
   perform a second rich spike at an air-fuel ratio leaner than the predetermined air-fuel ratio; and
   switch operation mode from the first rich spike to the second rich spike at a timing when the second exhaust gas sensor issues a predetermined output characteristic indicative of a reduction in the oxygen concentration when the internal combustion engine runs at heavy load.

2. The exhaust purifying system for an internal combustion engine according to claim 1, wherein
   the SCR is an Fe-based zeolite catalyst.

3. The exhaust purifying system for an internal combustion engine according to claim 1, further comprising:
   a second NOx selective catalytic reduction (hereinafter referred to as a "second SCR") disposed downstream of the exhaust gas sensor.

4. The exhaust purifying system for an internal combustion engine according to claim 3, wherein
   the second SCR is an Fe-based zeolite catalyst.

5. An exhaust purifying system for an internal combustion engine capable of a lean burn operation, the exhaust purifying system comprising:
   an NOx storage-reduction catalyst (hereinafter referred to as an "NSR catalyst") disposed in an exhaust passage of the internal combustion engine;
   an NOx selective catalytic reduction (hereinafter referred to as an "SCR") disposed downstream of the NSR catalyst;
   an exhaust gas sensor disposed downstream of the SCR, the exhaust gas sensor producing an output according to an NH₃ concentration;
   an electric control unit programmed to perform a rich spike, wherein the electric control unit is further programmed to start the rich spike at a predetermined timing during a lean burn operation and terminates the rich spike at a timing when the exhaust gas sensor issues a predetermined output characteristic indicative of a rise in the NH₃ concentration;
   a three-way catalyst disposed upstream of the NSR catalyst; and
   a second exhaust gas sensor disposed upstream of the NSR catalyst and downstream of the three-way catalyst, the second exhaust gas sensor producing an output according to an oxygen concentration:
   wherein the electric control unit is further programmed to:
   perform a first rich spike at a predetermined air-fuel ratio;
   perform a second rich spike at an air-fuel ratio leaner than the predetermined air-fuel ratio; and
   switch operation mode from the first rich spike to the second rich spike at a timing when the second exhaust gas sensor issues a predetermined output characteristic indicative of a reduction in the oxygen concentration when the internal combustion engine runs at light load.

6. The exhaust purifying system for an internal combustion engine according to claim 5, wherein
   the SCR is an Fe-based zeolite catalyst.

7. The exhaust purifying system for an internal combustion engine according to claim 5, further comprising:
   a second NOx selective catalytic reduction (hereinafter referred to as a "second SCR") disposed downstream of the exhaust gas sensor.

8. The exhaust purifying system for an internal combustion engine according to claim 7, wherein
   the second SCR is an Fe-based zeolite catalyst.

* * * * *